United States Patent
Ivarsson

(10) Patent No.: US 9,689,180 B2
(45) Date of Patent: Jun. 27, 2017

(54) LOCKING SYSTEM FOR CAR WHEEL

(71) Applicant: Rimgard Sweden AB, Stockholm (SE)

(72) Inventor: Lars Ivarsson, Stockholm (SE)

(73) Assignee: Rimgard Sweden AB, Stockholm (SE)

( * ) Notice: Subject to any disclaimer, the term of this patent is extended or adjusted under 35 U.S.C. 154(b) by 0 days.

(21) Appl. No.: 15/333,302

(22) Filed: Oct. 25, 2016

(65) Prior Publication Data

US 2017/0130489 A1    May 11, 2017

Related U.S. Application Data

(60) Provisional application No. 62/252,008, filed on Nov. 6, 2015.

(30) Foreign Application Priority Data

Nov. 6, 2015 (SE) .................................. 1551440

(51) Int. Cl.
| | | |
|---|---|---|
| *E05B 77/44* | (2014.01) | |
| *E05B 73/00* | (2006.01) | |
| *B60B 27/06* | (2006.01) | |

(52) U.S. Cl.
CPC .............. *E05B 77/44* (2013.01); *E05B 73/00* (2013.01); *B60B 27/065* (2013.01); *B60B 2900/3318* (2013.01)

(58) Field of Classification Search
CPC ....... E05B 77/44; E05B 73/00; B60B 27/065; B60B 2900/3318
USPC ......................................................... 70/225
See application file for complete search history.

(56) References Cited

U.S. PATENT DOCUMENTS

| | | | | |
|---|---|---|---|---|
| 2,568,370 A | * | 9/1951 | Scuderi | B60B 3/18 301/35.52 |
| 3,995,461 A | * | 12/1976 | Hudson | B60B 7/068 301/37.21 |
| 5,410,897 A | * | 5/1995 | Edmondson | B60R 25/093 188/32 |
| 6,419,326 B1 | * | 7/2002 | Rains | B60B 7/16 301/37.21 |
| 8,733,140 B2 | * | 5/2014 | Jones | B60B 7/16 188/32 |
| 8,739,585 B2 | | 6/2014 | Sims | |
| 8,943,865 B1 | | 2/2015 | Bullock | |
| 2004/0112101 A1 | * | 6/2004 | Labuschagne | B60B 5/02 70/259 |
| 2008/0127691 A1 | * | 6/2008 | Castillo | B60B 7/16 70/225 |
| 2014/0077582 A1 | * | 3/2014 | Sims | B60B 3/165 301/35.623 |
| 2014/0157841 A1 | * | 6/2014 | Thomas | B60R 25/00 70/237 |
| 2015/0143859 A1 | * | 5/2015 | Beck, Jr. | F16B 41/005 70/431 |
| 2015/0251488 A1 | * | 9/2015 | Hoff | B60B 7/16 301/37.21 |

* cited by examiner

*Primary Examiner* — Suzanne Barrett
(74) *Attorney, Agent, or Firm* — Berggren, Inc.

(57) ABSTRACT

A locking device for car wheels is disclosed to prevent unauthorized removal of the wheels. The device includes a locking unit that allows covering of special bolt heads by covering wings. The locking module can be further covered with a covering plate. The system provides multiple layers of protection to the wheels and considerably lengthens the time required to remove the wheel without proper keys.

8 Claims, 5 Drawing Sheets

LOCKING SYSTEM FOR CAR WHEEL

PRIORITY

This application claims priority of U.S. provisional application No. 62/252,008 and of Swedish application number SE 1551440-9, both of which were filed on Nov. 6, 2015, and the content of both of which is incorporated herein by reference.

FIELD OF THE INVENTION

This invention relates to methods and devices to prevent unauthorized removal of car wheels. More specifically this invention relates to a comprehensive locking system for car wheels.

BACKGROUND OF THE INVENTION

Unauthorized removal of car parts, specifically alloy wheels is a frequently occurring problem all over the world. Due to their high value custom wheels and tire rims are examples of items frequently stolen. Accordingly, there is a great need for device to protect wheels from unauthorized removal.

There have been attempts to provide such protection. For example U.S. Pat. No. 8,739,585 and U.S. Pat. No. 8,943,865 disclose antitheft devices for car wheels. However, none of the devices known in the art provide truly reliable wheel locks to prevent theft effectively. All of the known devices can be removed relatively easily by an experienced thief. Some car brands do use five lug nuts instead of four on each wheel, which could increase the time a thief has to spend to remove the wheel. Some car brands use special lug nuts that require specific keys to open them. The main idea in these solutions is that increasing the time needed to remove the wheel may to some extent prevent a theft. However, removing the wheels is still relatively easy and the problem of unauthorized removal of car wheels is not yet solved.

This invention provides a comprehensive system for preventing stealing of car wheels. This system provides multiple layers of protection and makes unauthorized removal of wheels complicated and time consuming and therefore keeps the thieves away from wheels protected with the system of this invention.

SUMMARY OF THE INVENTION

It is an object of this invention to provide a locking system for car wheels to prevent unauthorized removal of the wheels.

It is an object of this invention to provide a locking system for car wheels that includes more than one layer of protection.

It is an object of this invention to provide a locking system with at least two different types of bolts.

It is an object of this invention to provide a locking system for car wheels that comprises covering wings extending over special bolts and preventing unauthorized access to the bolt heads.

It is an object of this invention to provide a locking system for car wheels that requires a special key to access the lug nuts.

It is an object of this invention to provide a locking system for car wheel that increases the time required for an unauthorized person to remove the wheels.

It is an object of this invention to provide a locking system for car wheels.

According to an aspect of the invention, a wheel locking device is provided comprising a plurality protective cases adapted to restrict, limit or block access to bolt heads and/or lug nuts of a wheel or rim. The protective cases may be mechanically connected to each other by a center part, which e.g. may be adapted to be arranged centrally over the wheel hub.

At least one of the protective cases may be provided with an access hole allowing a bolt head or lug nut to be accessed by e.g. a user. The access hole may e.g. be formed as a through hole extending through the protective case in a same direction as an underlying wheel bolt.

The wheel locking device may further comprise at least one access control member, such as e.g. a covering wing, operable to be arranged in at least two different states. The access control member may in a first state be adapted to limit or block access to a bolt head or lug nut, and in a second state be adapted to allow access to said bolt head or lug nut. The access control member may be operable to assume the different states upon actuation by an authorized user.

The access control member may be adapted to cooperate with a protective case so as to cover or block e.g. an access hole of the protective cover. In one example, at least a portion the access control member may be slid in a transverse direction of the through hole and arranged within the through hole so as to block access to the bolt head or lug nut. Preferably, the control member may form a cover or lid adapted to fully cover the portion of the access hole and the bolt head or lug nut.

The access control member may be operated by means of a locking mechanism arranged in the center part. The locking mechanism may e.g. comprise a locking unit having a key hole accessible from a front side of the center part and a lock stud on a back side of the center part. The lock stud may be adapted to cooperate with the access control member such that the access control member can be arranged in the different states as discussed above. The locking mechanism hence allows e.g. a user to lock and unlock the wheel locking device, i.e., causing the access control member to a assume a state limiting or allowing access to the bolt head or lug nut, by means of e.g. a key.

The locking mechanism may further comprise a lock plate that may be attached to the lock stud and the access control member. The lock plate may in one example be guided by a guiding rim.

The locking stud may be turned within the guiding rim when a key is turned in the key hole and thereby cause access control member to slide so as to assume a state restricting or allowing access to the lug nut or bolt head.

According to an embodiment of this invention, the wheel locking device may comprise:
  a center part having a front side and a back side; a multitude of nut head cases extending radially from the center part, wherein at least two of the nut head cases are covered and adapted to cover lug nut heads, and at least two case have a through hole perpendicular to the front side of the center part for a special bolt head to fit in the case; a locking unit extending through the center part, and having a key hole on the front side of the center part and a lock stud on the back side of the center part; a lock plate on the back side of the center part within a guiding rim and being attached to the lock stud; the guiding rim having at least two slots through which two covering wings extend toward the nut head cases having the through holes; the covering wings being attached to the opposite ends of the locking plate with pins; wherein: the locking stud turns within the guiding rim when a key is turned in the key hole; turning of the locking stud moves the pins and the pins move the covering wings to cover the through holes when the device is in locked position and expose the holes when the device is in unlocked position, whereby an access is provided to the special bolt heads.

It is an object of this invention to provide a kit comprising at least two different types of attachment bolts, a wheel locking device having a locking unit that requires a key to allow access to at least one attachment bolt, a key to open the locking unit, and wrenches to remove the bolts.

It is an object of this invention to provide a car wheel and a locking system for the wheel, wherein the locking system comprises at least two different types of attachment bolts, a wheel locking device having a locking unit that requires a key to allow access to at least one attachment bolt.

SHORT DESCRIPTION OF THE DRAWINGS

DETAILED DESCRIPTION OF THE INVENTION

The invention is now described with reference to the appended drawings.

Figure 1:
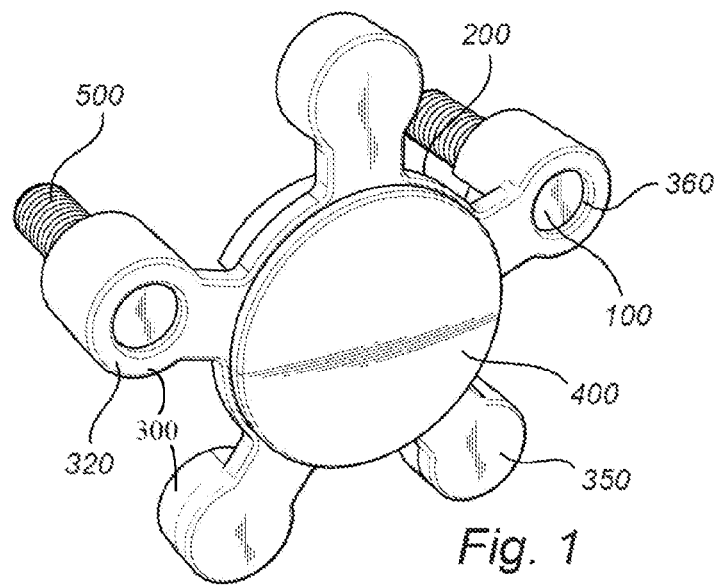
FIG. 1 is a front view of the locking device of this invention in locked position with an outer cover attached.

FIG. 1 shows a front view of the locking device. The locking device has a center part (200) and a multitude of nut head cases (300). In this embodiment the device has five nut head cases (300) three of which (350) are lug nut head cases and two of which are special bolt head cases (320). The nut head cases (300) extend radially from the center part (200). Those two cases (320) that are for special bolt heads have a through aperture/hole (360) perpendicular to the front side of the device. The device is shown to have a covering plate (400) covering the center part (200). The device shown in FIG. 1 is in locked position as the covering wings (100) cover apertures (360) and special bolt heads (550, shown in FIGS. 7 and 8) are not accessible.

Figure 2:
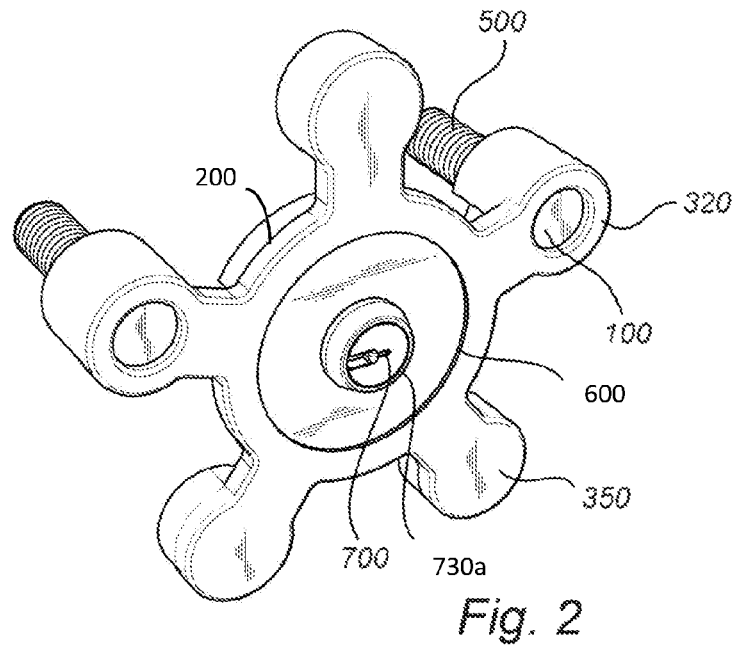
FIG. 2 is a front view of the locking device of this invention in locked position without an outer cover.

FIG. 2 shows a front view of the locking device without the covering plate. The center piece (200) has a cover retaining notch (600) for attachment of the covering plate (400, shown in FIG. 1). The covering plate may be attached to the notch for example by snapping or by screwing. In middle of the center part (200) there is a key hole (700) of a lock unit (730a shown in FIG. 3). The lock unit (730a) penetrates the center part (200). Again the device is in locked position as the cover wings (100) cover the apertures (360) and the heads of the special bolts (550) are not accessible.

Figure 3:
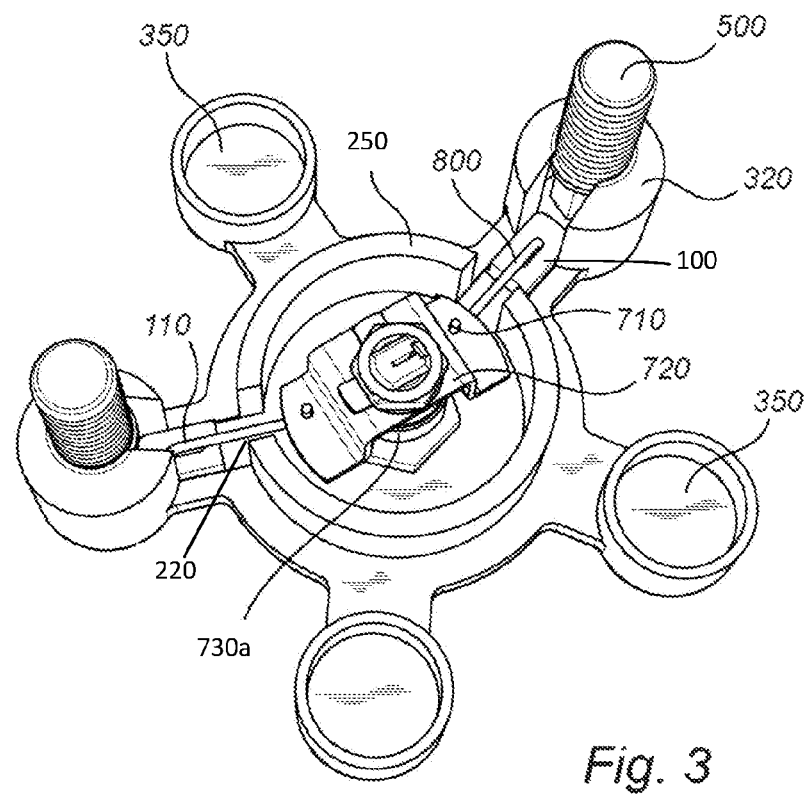
FIG. 3 is a back view of the locking device of this invention in locked position

FIG. 3 shows a back view of the locking device. The back side of the center part has a guiding rim (250). The guiding rim (250) has slots (220) wide enough to allow the covering wings (100) to extend through the slots (220). There is a lock plate (720 within the guiding rim (250) covering the lock stud (730). The lock plate (720) has pin holes (710) for attaching first ends of attachment pins (800) while the second ends of the attachment pins (800) are attached to a pin hole (110) in the covering wings (100). Upon turning a key in the keyhole (700) (shown in FIG. 1) the lock plate (720) turns within the guiding rim (250) and the pins (800) attached to the lock plate (720) change position thereby extending the covering wings (100) through the slots (220) to cover the apertures (360 shown in FIG. 1) when the device is in closed or locked position, and pulling the covering wings (100) to expose the apertures (360 shown in FIG. 1) when in open or unlocked position.

Figure 4:
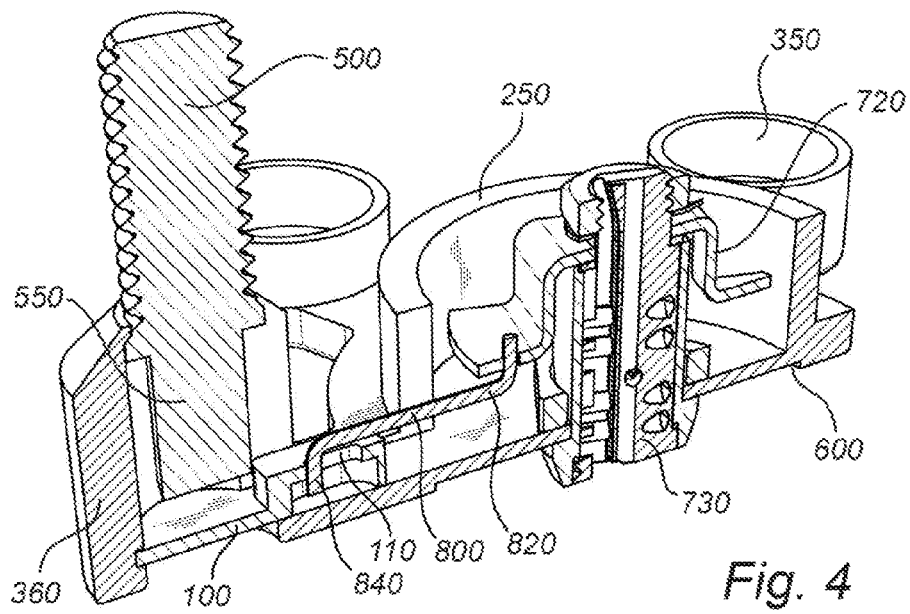
FIG. 4 is a cross sectional view of the locking device of this invention in locked position.

FIG. 4 shows a cross section of the locking device. The figure shows the device in closed or locked position as the covering wings (100) are shown to cover the aperture (360) thereby preventing access to the special bolt (500). The figure shows the first and the second ends (820, 840) of the pin (800), the lock plate (720), the cover retaining notch (600), and the case for lug nut head (350).

Figure 5:
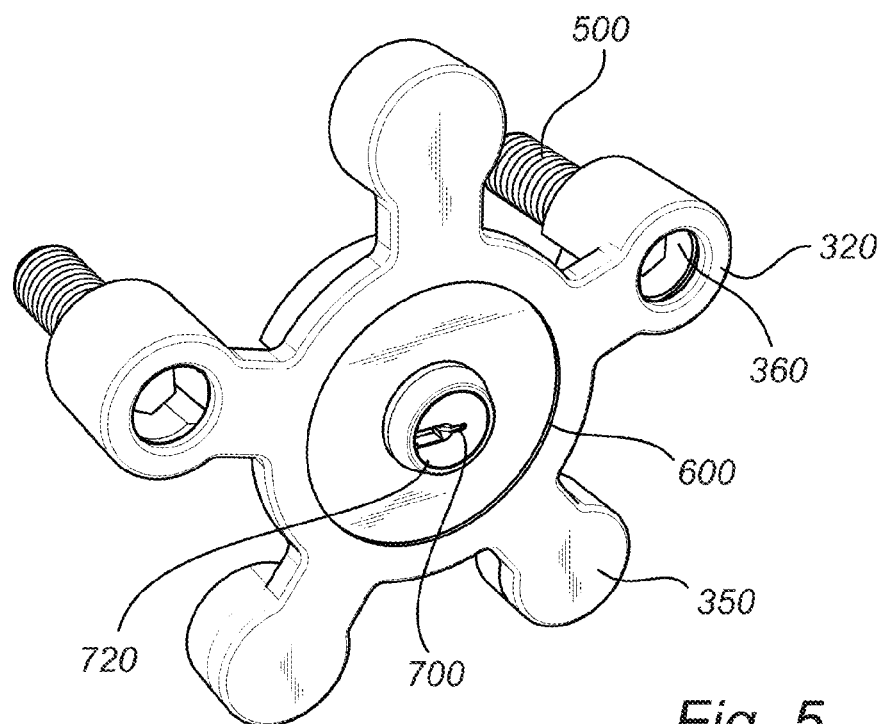
FIG. 5 is a front view of the locking device of this invention in open position without an outer cover.

FIG. 5 shows a front view of the locking device in open position as the apertures (360) are open and there is a free access to the special bolts (500).

Figure 6:
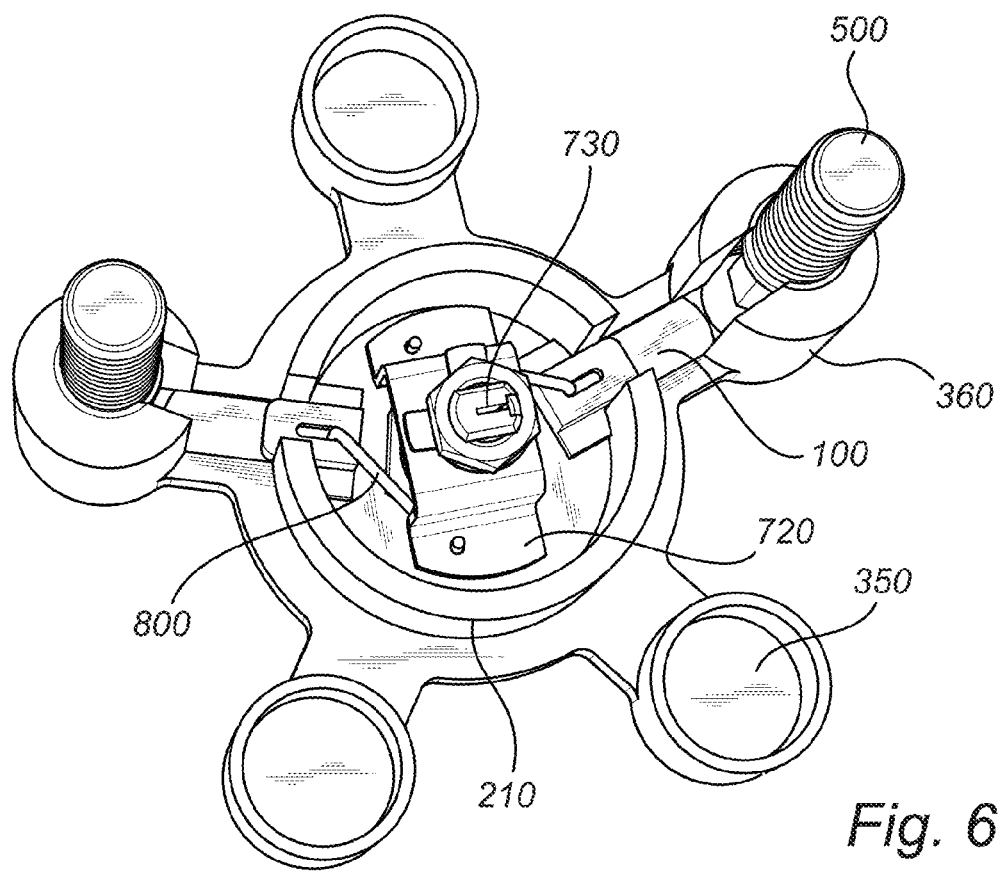
FIG. 6 is a back view of the locking device of this invention in an open position.

FIG. 6 shows a back view of the locking device in open position as the covering wings (100) are pulled away to expose the apertures (360) by turning a key in the key hole (700, shown in FIG. 1) to turn the lock plate (720) within the guiding rim (250) and thereby moving the pins (800) attached from their first end to the lock plate (720) and from the second end to the covering wings (100).

Figure 7:
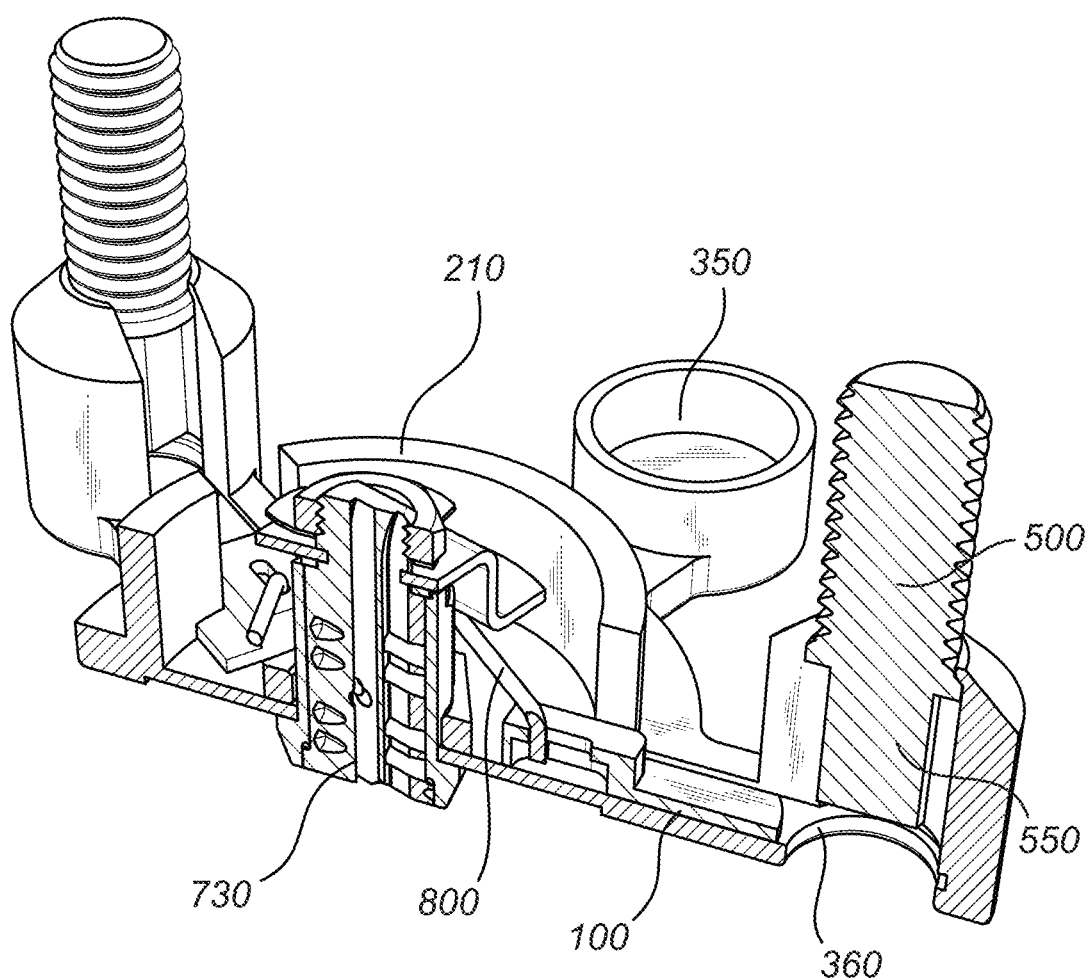
FIG. 7 is a cross sectional view of the locking device in an open position without an outer cover.

FIG. 7 shows a cross sectional view of the locking device in an open position as the covering wings (100) are pulled away to expose the apertures (360).

Figure 8:
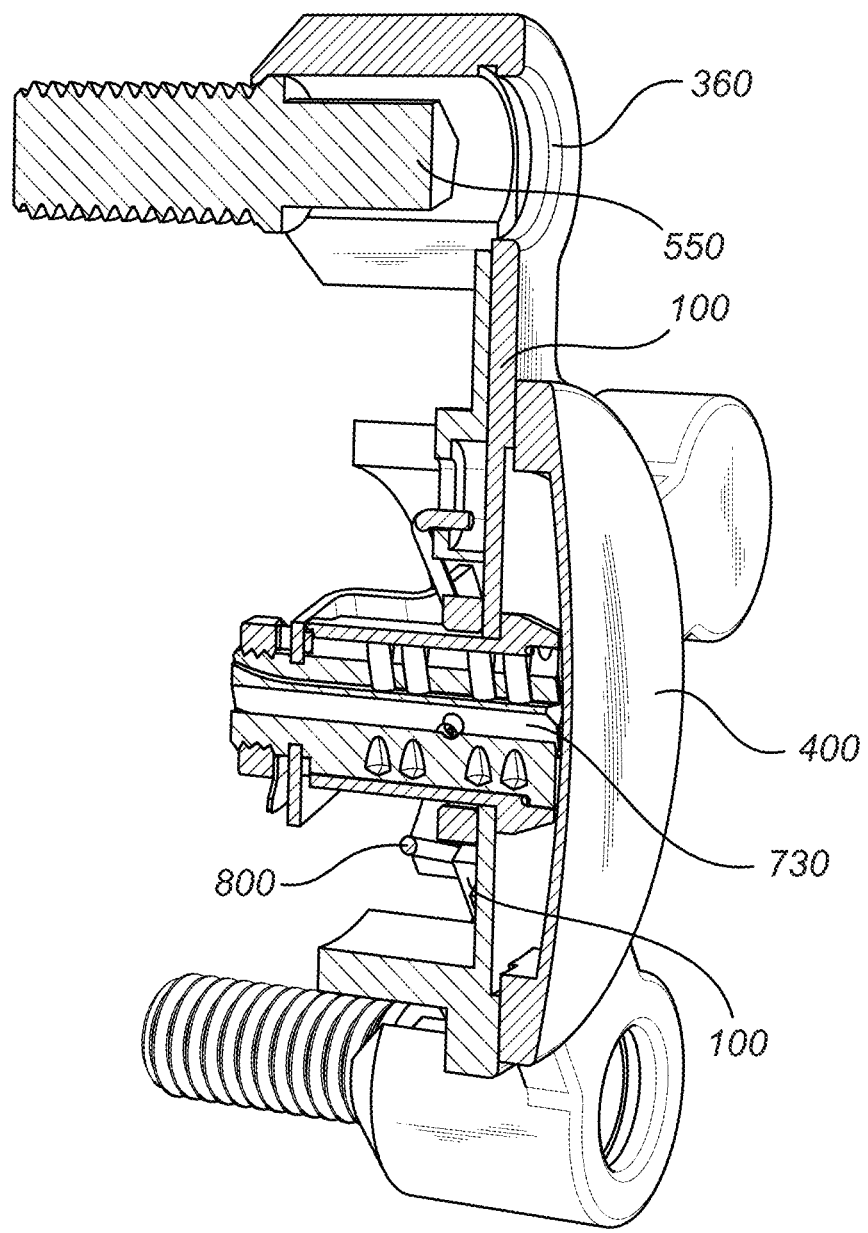
FIG. 8 is a cross sectional view of the locking device in an open position with an outer cover.

FIG. 8 shows a cross sectional view of the locking device in a closed position where the covering wings (100) are extended to cover the apertures (360). The figure also shows the additional protection provided by the covering plate (400) attached to prevent access to the lock unit (720).

According to a preferred embodiment, the locking device of this invention comprises a center part from which five nut head cases are extended radially. The center is shown to be circular, but it may have other shapes as well. Two of the nut head cases have a through aperture perpendicular to the front side of the device and three of the nut head cases are covered. The covered cases are to cover regular lug nut heads, while the cases with through holes are for special bolts. The special bolts are preferably longer than the regular lug nuts and they also require a special wrench to remove them. The device also has a lock unit that extends through the center part. The key hole of the lock unit is on the front side of the center part. The lock unit has a lock stud that extends through the center part from the front side to the back side of the center part. A locking plate is attached to the locking stud. According to one embodiment the locking stud goes through the locking plate. The locking plate is capable of turning within a guiding rim of the back side of the center part. The guiding rim has two slots opening toward the special nut head cases. Two pins having a middle part and two ends bent to opposite directions are attached to the lock plate from their first ends via pinholes in the lock plate. The other ends of the pins are attached to two covering wings, each extending through a slot in the guiding rim toward one special bolt nut case. When the lock stud is turned by turning a key in the key hole the locking plate attached to the lock stud turns within the guiding rim. When the locking plate turns it causes the pins to move as one of their ends is attached to the locking plate. When the pins move they cause the covering wings to move: either to extend outward to cover the through holes of the special bolt head case or inward to expose the through holes. Thus when the device is in closed or locked position an access to the special bolt heads is prevented by the covering wings.

The locking system according to this invention provides multiple layers of protection against a theft of a car wheel. The first layer of protection is the system includes two types of bolts to attach each wheel: two or more regular lug nuts are used for each wheel and these nuts require a usual type of lug wrench. At least two special bolts are used in each wheel. These bolts require a special type of wrench. The second layer of the protection is provided by the covering wings that prevent access to the special bolt and by the locking key that is required to turn the lock stud to move the covering wings. Finally, the third layer of protection is provided by the covering plate that can be attached to cover the center piece and prevent observation and immediate access to the key hole. To add yet another layer of security, the lock unit may be a high security cylinder lock with features making its manipulation extremely difficult with known methods such as drilling. Example of such high security lock would be Assa Abloy's cylinder locks in Dessa+ series.

A skilled artisan understands that the number of special bolts may vary, but it is essential that the system has two types of bolts. The skilled artisan also appreciates that the device can be customized to various types of wheels, e.g. wheels that are attached with four or with five bolts various patterns.

The device may be manufactured from various types of materials; however aluminum and steel are the preferred materials.

What is claimed is:

1. A wheel locking device comprising:
   a center part having a front side and a back side;
   a multitude of nut head cases extending radially from the center part, wherein at least two of the nut head cases are covered and adapted to cover lug nut heads, and at least two cases have a through hole perpendicular to the front side of the center part for a bolt head to fit in the case;
   a locking unit extending through the center part, and having a key hole on the front side of the center part and a lock stud on the back side of the center part;
   a lock plate on the back side of the center part within a guiding rim and being attached to the lock stud;
   the guiding rim having at least two slots through which two covering wings extend toward the nut head cases having the through holes;
   the covering wings being attached to the opposite ends of the locking plate with pins;
   wherein:
   the locking stud turns within the guiding rim when a key is turned in the key hole;
   turning of the locking stud moves the pins and the pins move the covering wings to cover the through holes when the device is in locked position and expose the holes when the device is in unlocked position, whereby an access is provided to the bolt heads.

2. The device of claim 1, wherein the center part has a cover retaining notch in the front side and a covering plate is attached to the notch to cover the locking unit.

3. The device of claim 1, wherein the center part is circular.

4. The device of claim 1, wherein the device has two cases for bolt heads and three for lug nut heads.

5. The device of claim 1 claims, wherein the lock stud extends through the lock plate.

6. The device of claim 1 wherein the device is made of steel or aluminum.

7. A kit for locking a wheel, said kit comprising a locking device of claim 1, a multitude of lug nuts, at least two bolts, a key fitting to the key hole and wrenches to open the lug nuts and the bolts.

8. A car wheel kit comprising car wheels, locking devices of claim 1, a multitude of lug nuts, at least two bolts, a key fitting to the key hole and wrenches to open the lug nuts and the bolts.

* * * * *